United States Patent
Jehn

(10) Patent No.: US 12,319,119 B1
(45) Date of Patent: Jun. 3, 2025

(54) SOLAR-POWERED VEHICLE INTERIOR TEMPERATURE MANAGEMENT SYSTEM

(71) Applicant: James Jehn, Denver, CO (US)

(72) Inventor: James Jehn, Denver, CO (US)

( * ) Notice: Subject to any disclaimer, the term of this patent is extended or adjusted under 35 U.S.C. 154(b) by 0 days.

(21) Appl. No.: 18/999,752

(22) Filed: Dec. 23, 2024

(51) Int. Cl.
| | |
|---|---|
| B60H 1/00 | (2006.01) |
| B60J 1/20 | (2006.01) |
| H02S 20/30 | (2014.01) |
| H02S 30/20 | (2014.01) |

(52) U.S. Cl.
CPC ..... B60H 1/00428 (2013.01); B60H 1/00471 (2013.01); B60J 1/2063 (2013.01); B60J 1/2077 (2013.01); H02S 20/30 (2014.12); H02S 30/20 (2014.12)

(58) Field of Classification Search
CPC . B60H 1/00428; B60H 1/00471; H02S 20/30; H02S 20/20; B60J 1/2063; B60J 1/2077
USPC .......................................................... 454/69
See application file for complete search history.

(56) References Cited

U.S. PATENT DOCUMENTS

| | | | | |
|---|---|---|---|---|
| 4,636,579 | A * | 1/1987 | Hanak | H02S 30/20 136/246 |
| 6,460,593 | B1 * | 10/2002 | Floyd | E06B 9/40 296/97.7 |
| 7,310,966 | B2 * | 12/2007 | Wagner | F24F 1/04 62/298 |
| 9,821,637 | B1 * | 11/2017 | Robles | B60H 1/00428 |
| 10,364,601 | B2 * | 7/2019 | Piekny | H02J 7/35 |
| 11,264,940 | B2 * | 3/2022 | Townley | B60L 1/10 |
| 11,548,350 | B2 * | 1/2023 | Salmeri | B60H 1/00264 |
| 2004/0176021 | A1 | 9/2004 | Mills | |
| 2006/0156738 | A1 | 7/2006 | Khalil | |
| 2007/0089444 | A1 | 4/2007 | Chen | |
| 2009/0247063 | A1 | 10/2009 | Vollertsen | |
| 2011/0227361 | A1 | 11/2011 | Dai | |
| 2014/0027069 | A1 * | 1/2014 | Oppizzi | E06B 9/40 160/6 |
| 2014/0224434 | A1 * | 8/2014 | Gross | E06B 9/42 160/405 |
| 2017/0326946 | A1 | 11/2017 | Jacob | |
| 2018/0015807 | A1 | 1/2018 | Koo | |

(Continued)

*Primary Examiner* — Avinash A Savani
*Assistant Examiner* — Dana K Tighe
(74) *Attorney, Agent, or Firm* — Gugliotta & Gugliotta, LPA

(57) ABSTRACT

A solar-powered vehicle interior temperature management system includes a flexible sun blocking textile configured for mounting on a vehicle's interior windshield surface, with integrated photovoltaic panels on its outward-facing surface. The system includes a spring roller mounting mechanism at the windshield's upper edge and fasteners at the lower edge for dashboard attachment. An enclosure mounted adjacent to the spring roller houses rechargeable batteries and squirrel cage fans. The photovoltaic panels collect solar energy and charge the batteries through a charge controller. When activated via a power switch, the fans create air movement to cool the vehicle interior. The entire system mounts on the interior side of the windshield, protecting components from weather and vandalism while requiring no permanent vehicle modifications. The flexible textile construction allows the system to be rolled for storage when not in use, while maintaining solar charging capability during deployment.

15 Claims, 4 Drawing Sheets

(56) References Cited

U.S. PATENT DOCUMENTS

| | | |
|---|---|---|
| 2018/0083480 A1 | 3/2018 | Burton et al. |
| 2019/0241041 A1 | 8/2019 | Russ |
| 2019/0283535 A1 | 9/2019 | Chen |
| 2023/0019165 A1* | 1/2023 | Baudo ........................ E06B 9/42 |
| 2023/0028387 A1* | 1/2023 | Consadori ............... H02S 20/22 |
| 2024/0308371 A1* | 9/2024 | Welles ................... B60K 16/00 |
| 2024/0351408 A1* | 10/2024 | Yamazaki ............... B60K 35/22 |

\* cited by examiner

SOLAR-POWERED VEHICLE INTERIOR TEMPERATURE MANAGEMENT SYSTEM

CROSS-REFERENCE TO RELATED APPLICATIONS

There are no previously filed, nor currently any co-pending applications, anywhere in the world.

BACKGROUND OF THE INVENTION

1. Field of the Invention

The present invention relates to a portable, solar-powered vehicle cooling system integrated into a stowable windshield cover that combines passive sun-blocking with active ventilation to reduce interior temperatures in parked vehicles without requiring permanent vehicle modification or connection to the vehicle's electrical system.

2. Description of the Related Art

Vehicle interior temperature management, particularly in parked cars exposed to direct sunlight, represents a significant challenge for both passenger comfort and vehicle maintenance. When vehicles are parked in sunny conditions, interior temperatures can rapidly rise to dangerous levels-often exceeding 140° F. (60° C.). This creates several critical problems affecting vehicle owners and operators.

The extreme heat buildup in parked vehicles leads to immediate passenger discomfort upon vehicle re-entry, potentially dangerous contact with hot surfaces such as steering wheels and seats, and extended waiting periods for the vehicle's air conditioning system to effectively cool the interior. Beyond passenger comfort, this heat accumulation accelerates the degradation of interior materials and electronics, places increased strain on the vehicle's air conditioning system, and results in higher fuel or energy consumption during the initial cooling period.

Current solutions in the market present various limitations. Traditional passive solutions, such as conventional windshield sunshades, provide basic heat reflection but lack active cooling capability. While window tinting offers a permanent solution, it is subject to legal restrictions and similarly lacks active cooling functionality. Active solutions, such as battery-powered ventilation fans, either drain the vehicle's battery or require separate power sources with limited runtime. Existing solar-powered cooling systems typically require permanent vehicle modifications, involve complex installation procedures, and are often exposed to weather damage.

Some methods and devices are known that incorporate various mechanisms for vehicle interior cooling. For example:

U.S. Patent Application Publication US20190241041 discloses a fan assembly mounted on a vehicle that uses ambient air to cool the operator, with solar protection provided by a canopy.

U.S. Patent Application Publication US20190283535 describes a flexible solar panel used to power a cooling system that regulates the temperature inside a parked vehicle.

U.S. Patent Application Publication US20180015807 teaches a cooling assembly for generating and distributing cooled air in a vehicle, powered by solar panels and an internal battery, and mounted in an open vehicle window.

Despite these developments, a need remains for a solution that provides both passive and active cooling, operates independently of the vehicle's electrical system, can be easily installed and removed, is portable between vehicles, requires no permanent modification, and remains cost-effective and energy efficient. Additionally, the solution should be capable of being stored when not in use.

The present invention addresses these limitations by providing an integrated solution that combines solar power generation, energy storage, and active cooling into a single, portable windshield cover that can be easily deployed and stored. This novel approach provides a comprehensive solution to the vehicle interior heating problem while avoiding the limitations of existing passive and active cooling methods.

SUMMARY OF THE INVENTION

It is thus an object of the present invention to provide an energy-efficient, self-contained solution for reducing interior temperatures in parked vehicles by combining solar power collection, energy storage, and active ventilation into a single, easily deployable windshield cover that can be installed and removed without vehicle modification.

The present invention provides a solar-powered vehicle interior temperature management system that combines passive sun blocking with active ventilation in a single, easily deployable device. The system includes a flexible sun blocking textile with integrated photovoltaic panels mounted on its outward-facing surface, configured to be installed entirely on the interior side of a vehicle windshield. The textile deploys from and retracts into a spring roller mounted at the windshield's upper edge. An enclosure adjacent to the spring roller houses rechargeable batteries that store energy collected by the photovoltaic panels, and ventilation fans that circulate air to cool the vehicle interior. A charge controller regulates power flow between the panels and batteries, while a power switch controls fan operation. The system requires no permanent vehicle modifications and can be transferred between vehicles. When not in use, the flexible construction allows the entire assembly to be rolled for storage while maintaining the solar charging capability during deployment.

It is an advantage of the present invention to provide a self-powered cooling solution that operates independently of a vehicle's electrical system.

It is another advantage of the present invention to enable quick installation and removal without requiring permanent vehicle modifications or professional installation.

It is another advantage of the present invention to combine both passive sun blocking and active ventilation in a single integrated device.

It is another advantage of the present invention to provide a portable solution that can be transferred between different vehicles.

It is another advantage of the present invention to incorporate energy storage capability allowing continued operation during periods of limited sunlight.

It is another advantage of the present invention to utilize flexible materials that allow the device to be easily stowed when not in use.

It is another advantage of the present invention to provide an environmentally friendly cooling solution that reduces the need for extended air conditioning use.

Another advantage of the present invention is to offer a cost-effective alternative to permanent solar-powered ventilation systems.

It is another advantage of the present invention to protect the solar panels and electrical components from weather exposure and vandalism by mounting them on the interior side of the windshield.

It is another advantage of the present invention to maintain the external appearance of the vehicle by avoiding visible external modifications.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
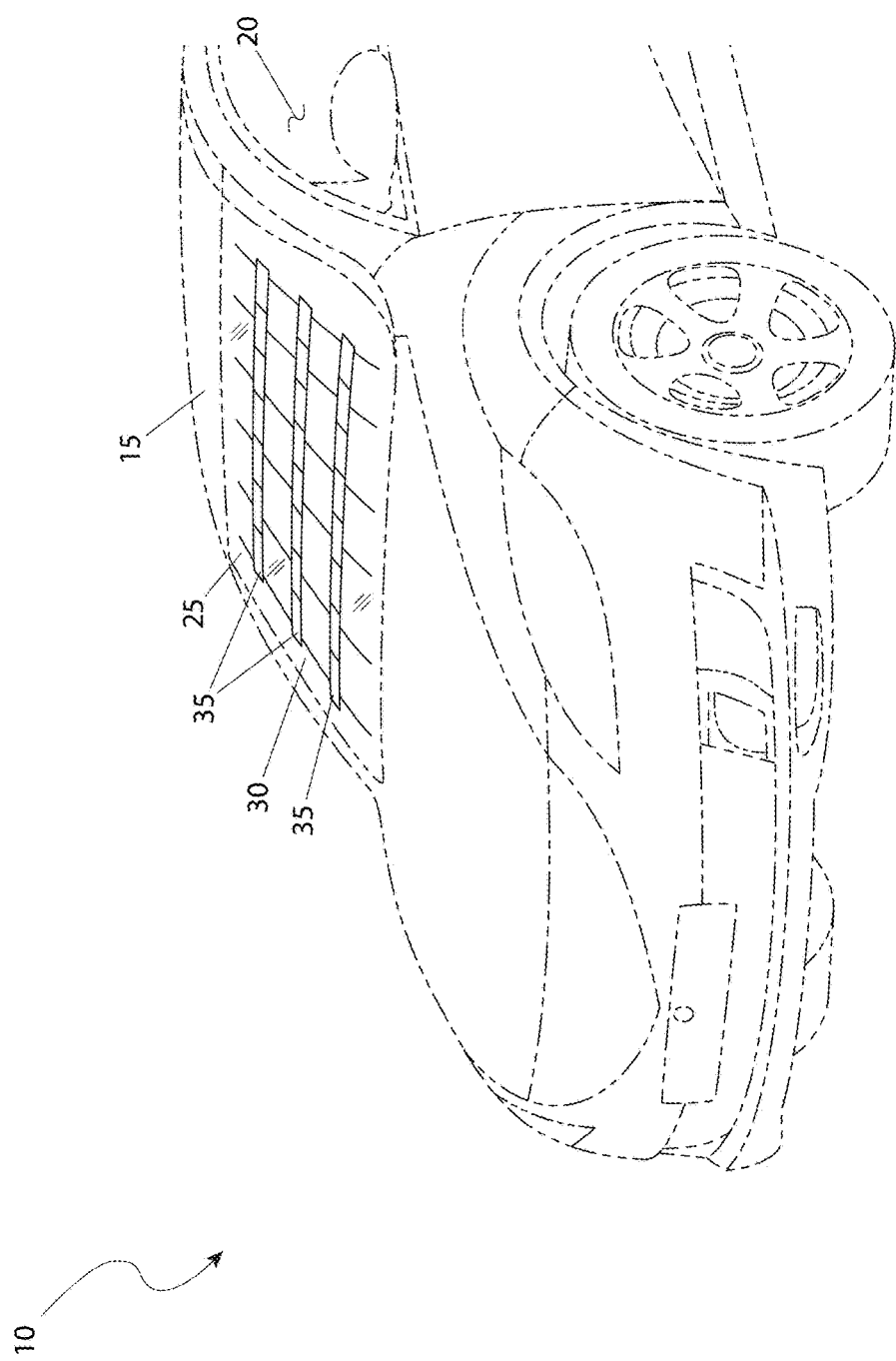
FIG. 1 is an environmental view of a vehicle sunshade 10, from the exterior of a motor vehicle 15, according to the preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, an environmental view of a vehicle sunshade 10, from the exterior of a motor vehicle 15, according to the preferred embodiment of the present invention is disclosed. The vehicle sunshade 10, provides for a permanently installed motor vehicle 15 windshield shade that is provided with integrated photovoltaic panels 35 that power active cooling fans 60. The motor vehicle 15 is depicted as a conventional passenger vehicle for purposes of illustration. However, the teachings of the vehicle sunshade 10 can be applied to all motor vehicle 15 including but not limited to trucks, buses, vans, commercial vehicles, recreational vehicles, and the like. As such, the use of the sunshade 10 with any particular type of motor vehicle 15 is not intended to be a limiting factor of the present invention.

The vehicle sunshade 10 is installed solely on the vehicle interior 20 behind the windshield 25 as shown. The vehicle sunshade 10 is provided with a large rectangular section of flexible sun blocking textile 30, visible through the windshield 25. The sun blocking textile 30 is deployed by the user on the vehicle interior 20 when the motor vehicle 15 is parked, and preferably in an outdoor location where the motor vehicle 15 is exposed to direct sun rays. A series of flexible photovoltaic panels 35 are provided on the outward facing surface of the sun blocking textile 30 where they can collect energy from the sun's rays. Further disclosure on the operation of the photovoltaic panels 35 will be provided herein below. It is noted that the vehicle sunshade 10 is envisioned to be made in multiple sizes, both width and height, to fit a wide range of motor vehicle 15, from the smallest subcompact car, up to the largest truck.

Figure 2:
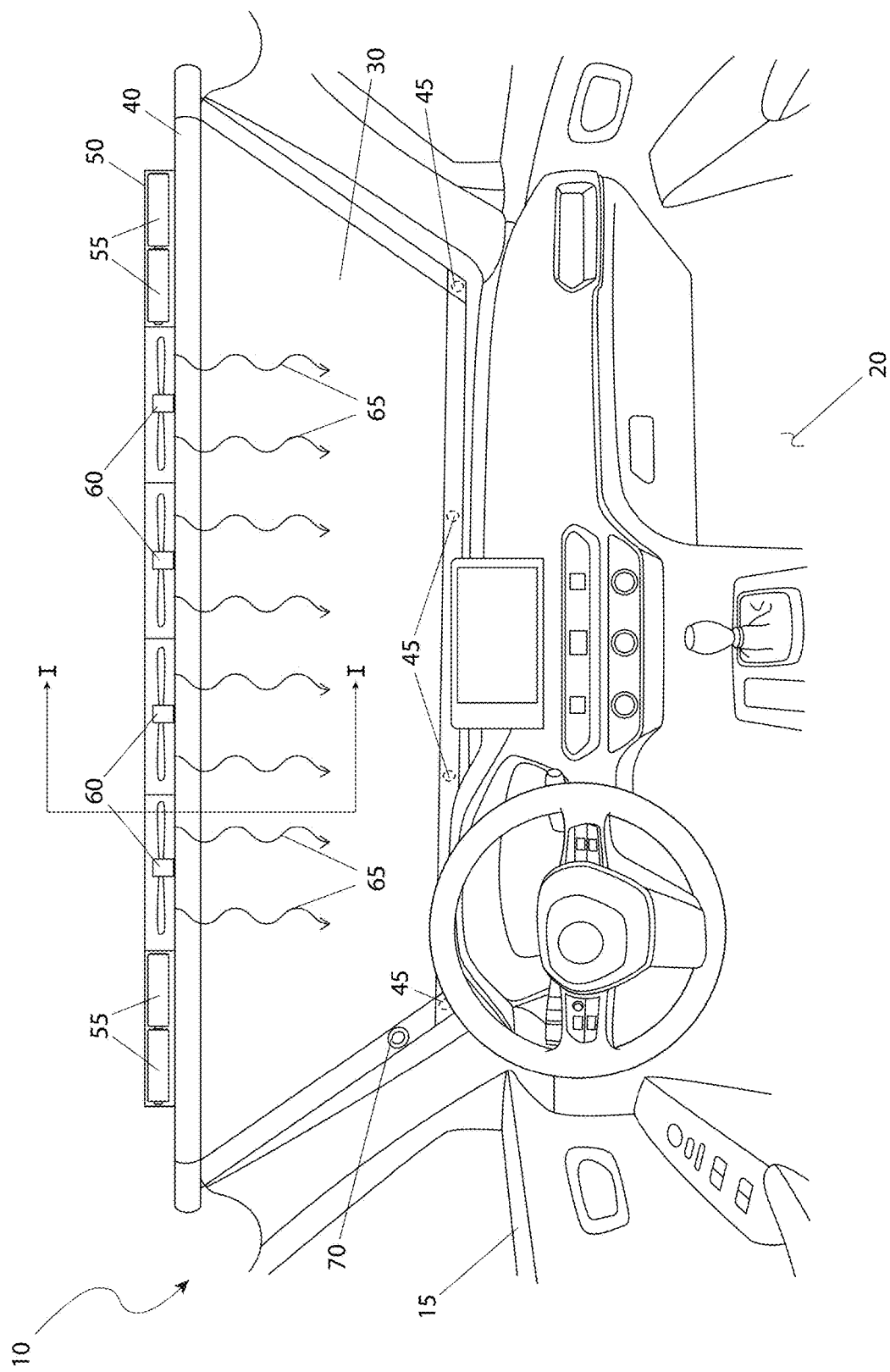
FIG. 2 is an environmental view of the vehicle sunshade 10, from the interior of a motor vehicle 15, according to the preferred embodiment of the present invention.

Referring next to FIG. 2, an environmental view of the vehicle sunshade 10, from the interior of a motor vehicle 15, according to the preferred embodiment of the present invention is depicted. The sun blocking textile 30 is shown in a deployed position as would be seen on the vehicle interior 20 when the motor vehicle 15 is parked. The sun blocking textile 30 is stowed on a spring roller 40 located at the top of the windshield 25 (not shown in this FIGURE due to illustrative limitations). During its deployed state while the motor vehicle 15 is parked, the sun blocking textile 30 is secured at the bottom of the windshield 25 with multiple fastening means 45 such as snaps, clips, magnets, suction cups, hook-and-loop-type fasteners (Velcro®), or the like. It is noted that any particular type of fastening means 45 is not intended to be a limiting factor of the present invention. An enclosure 50 is located on top of the spring roller 40 and runs nearly the entire length of the spring roller 40. The distal ends of the enclosure 50 are provided with multiple rechargeable batteries 55, herein shown via dashed lines due to their hidden nature. The interior section of the enclosure 50 is provided with multiple squirrel cage fans 60, herein shown via dashed lines due to their hidden nature. During operation, the fans 60 result in air movement 65 to aid in cooling down of the vehicle interior 20 during hot conditions. A power switch 70 is provided along the side of the sun blocking textile 30 to allow for control of the fans 60. While normally envisioned to be in the ON position during use, the fans 60 may be turned OFF if not needed, but still allow for the use of the sun blocking textile 30 and possible recharging of rechargeable batteries 55.

Figure 3:
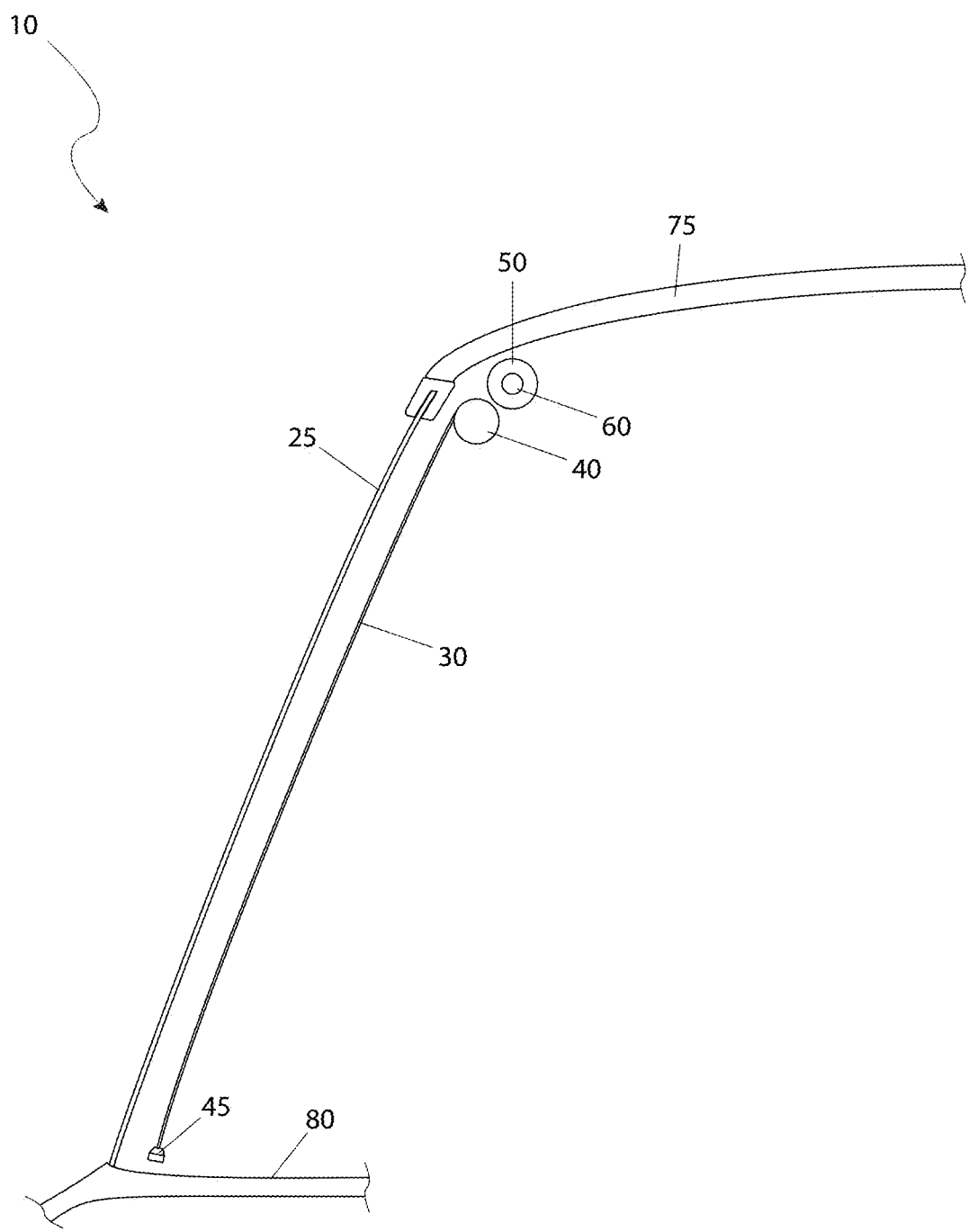
FIG. 3 is a sectional view of the vehicle sunshade 10, as seen along a line I-I, as shown in FIG. 2, according to the preferred embodiment of the present invention; and, FIG. 4 is an electrical block diagram of the vehicle sunshade 10, according to the preferred embodiment of the present invention.

Referring now to FIG. 3, a sectional view of the vehicle sunshade 10, as seen along a line I-I, as shown in FIG. 2, according to the preferred embodiment of the present invention is shown. This view clearly depicts the roof structure 75 and the dash structure 80 of the motor vehicle 15, as shown in FIG. 1. The spring roller 40 is located near the top of the windshield 25 with a portion of the sun blocking textile 30 wrapped around it. The enclosure 50 is located atop the spring roller 40, with the fans 60 visible on its interior. The sun blocking textile 30 is shown connected to the dash structure 80 using whatever fastening means 45 as appropriate.

Figure 4:
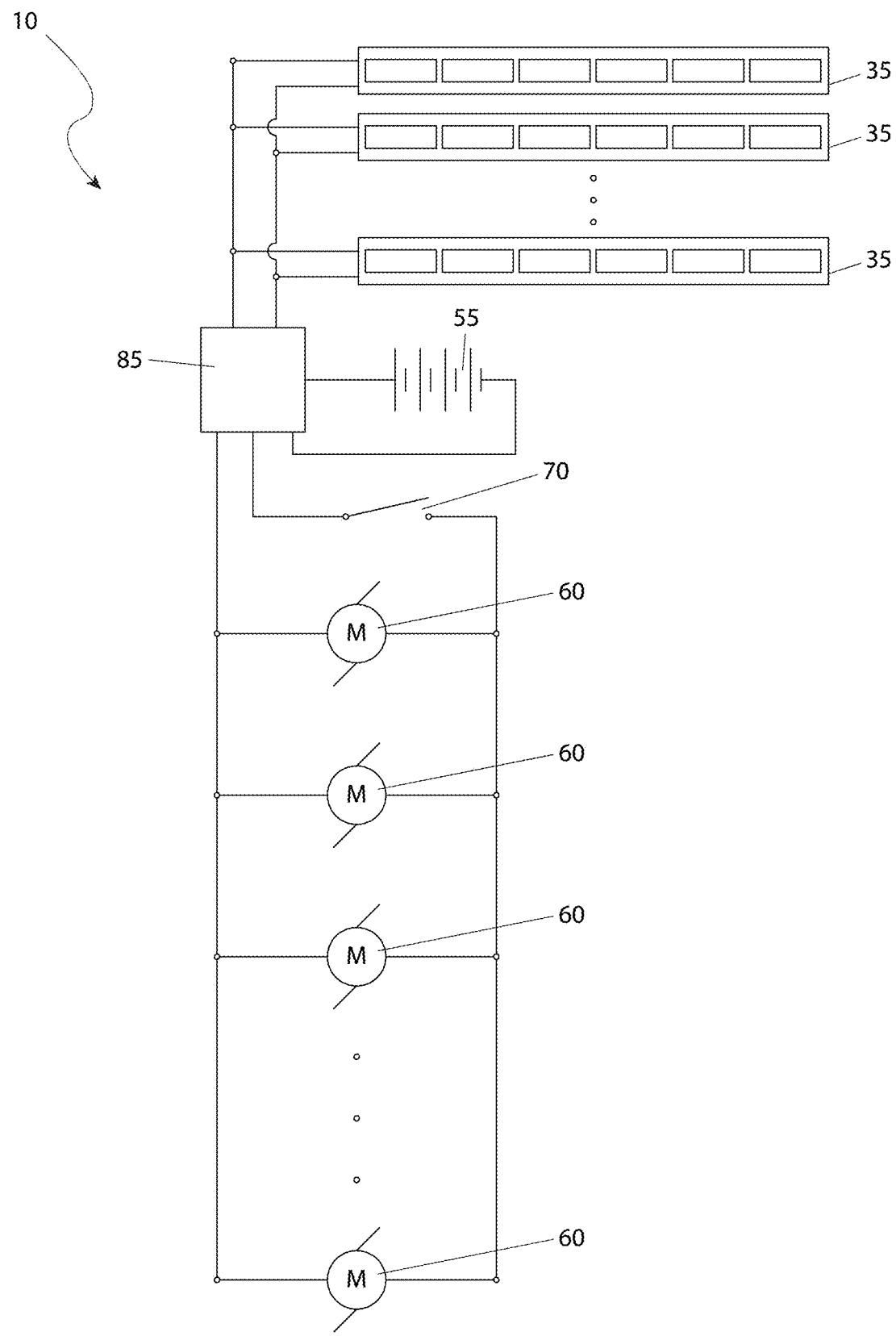

Referring to FIG. 4, an electrical block diagram of the vehicle sunshade 10, according to the preferred embodiment of the present invention is disclosed. Power for the sunshade 10 is generated by the multiple photovoltaic panels 35, envisioned to be wired in parallel as shown. The resultant combined power is then routed through a charge controller 85, envisioned to be located within the enclosure 50, as shown in FIG. 3, and connected directly to the rechargeable batteries 55 envisioned to be connected in series in shown. The charge controller 85 also provides a regulated voltage output which is connected to the power switch 70. When switched to the ON or closed position, the power switch 70 passes electrical power to the multiple fans 60 which are connected in parallel.

2. Operation of the Preferred Embodiment

In operation, the preferred embodiment of the present invention can be utilized by the common user in a simple and effortless manner with little or no training. It is envisioned that the vehicle sunshade 10 would be constructed in general accordance with FIG. 1 through FIG. 4. The user would procure the vehicle sunshade 10 kit from conventional procurement channels such as auto parts stores, vehicle accessory manufacturers, discount stores, department stores, mail order and internet supply houses and the like. Special attention would be paid to the overall size of the vehicle sunshade 10 such that it will fit upon the intended motor vehicle 15.

After procurement and prior to utilization, the vehicle sunshade 10 may be installed as standard or optional equipment as OEM (original equipment manufacturer) on new motor vehicle 15 or may be provided as a kit for add-on aftermarket use in an existing motor vehicle 15. The spring roller 40 would be fastened at the top of the windshield 25 using an appropriate mounting method such as screws, rivets, or the like. The enclosure 50 would likewise be installed above the spring roller 40 and be fastened to the top of the windshield 25 with the appropriate mounting method. The power switch 70 would be attached to the side of the windshield 25 with appropriate interconnecting wiring. The vehicle sunshade 10 includes a mounting mechanism for attaching the flexible sun blocking textile 30 to the vehicle windshield 25. As shown in FIGS. 2 and 3, this mounting mechanism comprises a spring roller 40 mounted at an upper edge of the windshield 25 and fastening means 45 at a lower edge of the flexible sun blocking textile 30 for securing to the vehicle dashboard 80. The spring roller 40 allows the flexible sun blocking textile 30 to be deployed when needed and retracted for storage, while the fastening means 45 secure the textile in position against the windshield 25. At this point in time, the vehicle sunshade 10 is ready for use.

During utilization, when the motor vehicle 15 is parked, preferably, but not necessarily in a sunny, outdoor location, the user would grasp the lower edge of the sun blocking textile 30 and pull it downward towards the lower edge of the windshield 25. The lower edge of the sun blocking textile 30 is fastened to the distal edge of the dash structure 80 using the fastening means 45. Prior to exiting the motor vehicle 15, the user may activate the fans 60 by switching ON the power switch 70. As the operation of the vehicle sunshade 10 relies on the photovoltaic panel 35 and the rechargeable batteries 55, there is no worry of depleting the chassis battery of the motor vehicle 15, no matter how long (hours or days), the motor vehicle 15 may be left unattended. During operation, the fans 60 provide for air movement 65 on the vehicle interior 20 to aid in cooling, especially when returning to the motor vehicle 15. The charge controller 85 limits the electrical output of the photovoltaic panel 35 to the rechargeable batteries 55 to prevent overcharging.

When returning to the motor vehicle 15, the user simply deactivates the power switch 70, releases the fastening means 45, and allows the spring roller 40 to return the sun blocking textile 30 and photovoltaic panel 35 to a stowed position, thus resetting the sunshade 10 for future usage cycles.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A vehicle interior temperature management system comprising:
   a flexible sun blocking textile configured to be mounted on an interior surface of a vehicle windshield;
   a plurality of photovoltaic panels mounted on an outward-facing surface of said flexible sun blocking textile;
   at least one rechargeable battery electrically connected to said plurality of photovoltaic panels;

at least one fan electrically connected to said at least one rechargeable battery;

a charge controller connected between said plurality of photovoltaic panels and said at least one rechargeable battery; and a mounting mechanism for attaching said flexible sun blocking textile to said vehicle windshield, wherein said mounting mechanism comprises a spring roller mounted at an upper edge of said windshield and at least one fastener at a lower edge of said flexible sun blocking textile.

2. The system of claim 1, wherein said
at least one fastener secures said flexible sun blocking textile to a vehicle dashboard.

3. The system of claim 2, wherein said at least one fastener comprises at least one of: snaps, clips, magnets, suction cups, or hook-and-loop fasteners.

4. The system of claim 1, further comprising an enclosure mounted adjacent to said spring roller, said enclosure housing said at least one rechargeable battery and said at least one fan.

5. The system of claim 4, wherein said enclosure extends substantially along an entire length of said spring roller and includes a ventilation channel configured that directs airflow downward along said flexible sun blocking textile to create a thermal barrier between said flexible sun blocking textile and said vehicle windshield, thereby enhancing both passive and active cooling of the vehicle interior.

6. The system of claim 1, further comprising a power switch electrically connected between said at least one rechargeable battery and said at least one fan for controlling operation of said fan.

7. The system of claim 1, wherein said at least one fan comprises a plurality of brushless motor-driven squirrel cage fans connected in parallel.

8. The system of claim 1, wherein said plurality of photovoltaic panels are connected in parallel and are flexible photovoltaic panels that conform to the shape of said flexible sun blocking textile during both deployment and storage, wherein said plurality of photovoltaic panels remain operational to collect solar energy in both deployed and partially rolled configurations.

9. The system of claim 1, wherein said at least one rechargeable battery comprises multiple batteries connected in series and housed within an enclosure mounted adjacent to said spring roller, said multiple batteries including a discharge control circuit that prevents complete discharge while maintaining sufficient charge for extended operation of said at least one fan during periods of reduced solar exposure.

10. The system of claim 1, wherein said flexible sun blocking textile is configured to be rolled onto said spring roller for storage when not in use.

11. A method of managing vehicle interior temperature comprising:

mounting a spring roller adjacent to an upper edge of a vehicle windshield;

deploying a flexible sun blocking textile from said spring roller;

securing a lower edge of said flexible sun blocking textile to a vehicle dashboard using at least one fastener;

collecting solar energy via photovoltaic panels mounted on said flexible sun blocking textile;

storing electrical energy in at least one rechargeable battery; and powering at least one fan using said stored electrical energy to create air movement within said vehicle interior.

12. The method of claim 11, further comprising controlling fan operation via a power switch while maintaining solar energy collection and storage.

13. A vehicle sunshade system comprising:

a flexible textile body having an outward-facing surface and an inward-facing surface;

a plurality of flexible photovoltaic panels integrated into said outward-facing surface in a pattern that allows for both efficient solar energy collection and flexibility for rolling;

an enclosure mounted at an upper edge of said flexible textile body;

at least one rechargeable battery housed within said enclosure;

a plurality of ventilation fans housed within said enclosure and configured to generate an airflow pattern that creates a thermal barrier between said flexible textile body and a vehicle windshield;

a charge controller housed within said enclosure and electrically connected between said photovoltaic panels and said rechargeable battery; and a roll-up mechanism integrated within said enclosure that allows said flexible textile body to be rolled up for storage and unrolled for deployment;

wherein said system is configured to be entirely mounted on an interior surface of the vehicle windshield and operates independently of the vehicle's electrical system.

14. The system of claim 13, wherein said ventilation fans are arranged to create an air flow pattern directed downward along said inward-facing surface of said flexible textile body, with the airflow velocity and pattern specifically designed to optimize heat removal from the vehicle interior without creating passenger discomfort.

15. The system of claim 13, wherein said flexible photovoltaic panels are arranged in a pattern that allows said flexible textile body to be rolled for storage, and wherein said flexible photovoltaic panels maintain operational capability to charge said at least one rechargeable battery even when partially deployed.

* * * * *